United States Patent
Ruan et al.

(10) Patent No.: US 8,922,929 B1
(45) Date of Patent: Dec. 30, 2014

(54) DISK DRIVE CALIBRATING FLY HEIGHT ACTUATOR AND LASER POWER FOR HEAT ASSISTED MAGNETIC RECORDING

(71) Applicant: Western Digital Technologies, Inc., Irvine, CA (US)

(72) Inventors: Huanxiang Ruan, Irvine, CA (US); Galvin T. Chia, Rancho Santa Margarita, CA (US); Poornima Nookala, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/927,100

(22) Filed: Jun. 25, 2013

Related U.S. Application Data

(60) Provisional application No. 61/834,790, filed on Jun. 13, 2013.

(51) Int. Cl.
*G11B 5/60* (2006.01)

(52) U.S. Cl.
CPC .............. *G11B 5/607* (2013.01); *G11B 5/6088* (2013.01)
USPC .............................................. 360/55; 360/75

(58) Field of Classification Search
None
See application file for complete search history.

(56) References Cited

U.S. PATENT DOCUMENTS

| | | | |
|---|---|---|---|
| 5,392,273 A | 2/1995 | Masaki et al. | |
| 5,805,559 A | 9/1998 | Murakami et al. | |
| 6,046,970 A | 4/2000 | DeCusatis et al. | |
| 6,359,433 B1 | 3/2002 | Gillis et al. | |
| 6,417,981 B1 | 7/2002 | Smith | |
| 6,636,460 B2 | 10/2003 | Akiyama et al. | |
| 6,700,724 B2 | 3/2004 | Riddering et al. | |
| 6,771,440 B2 | 8/2004 | Smith | |
| 6,801,376 B2 | 10/2004 | Smith | |
| 6,804,189 B2 | 10/2004 | Inase et al. | |
| 6,883,368 B2 | 4/2005 | Smith et al. | |
| 6,894,854 B1 | 5/2005 | Carlson et al. | |
| 6,950,260 B2 | 9/2005 | Coffey et al. | |
| 6,975,472 B2 | 12/2005 | Stover et al. | |
| 7,023,647 B2 | 4/2006 | Bloodworth et al. | |
| 7,068,449 B2 | 6/2006 | Riddering et al. | |
| 7,095,577 B1 | 8/2006 | Codilian et al. | |
| 7,099,097 B2 | 8/2006 | Hamaguchi et al. | |
| 7,161,882 B2 | 1/2007 | Lehr et al. | |
| 7,177,253 B2 | 2/2007 | Ishibashi et al. | |
| 7,180,692 B1 | 2/2007 | Che et al. | |
| 7,324,299 B1 | 1/2008 | Schreck et al. | |
| 7,369,340 B1 | 5/2008 | Dang et al. | |
| 7,400,473 B1 | 7/2008 | Krajnovich et al. | |

(Continued)

OTHER PUBLICATIONS

Lawrence A. Johnson, "Accelerated Aging Test of 1310 nm Laser Diodes", ILX Lightwave Application Note #29, May 31, 2006, http://www.ilxlightwave.com/appnotes/AN%2029%20REV01%20Accelerated%20Aging%20Test%20of%201310nm%20LD.pdf.

(Continued)

*Primary Examiner* — Wayne Young
*Assistant Examiner* — James L Habermehl

(57) ABSTRACT

A disk drive is disclosed comprising a disk, a head comprising a laser operable to heat the disk while writing data to the disk, and a fly height actuator (FHA) operable to actuate the head vertically over the disk. A laser power applied to the laser during a write operation is calibrated, and a FHA write setting is generated for the FHA as a function of the calibrated laser power.

12 Claims, 4 Drawing Sheets

(56) References Cited

U.S. PATENT DOCUMENTS

| | | |
|---|---|---|
| 7,412,143 B2 | 8/2008 | Rottmayer et al. |
| 7,436,620 B1 | 10/2008 | Kang et al. |
| 7,440,219 B2 | 10/2008 | Zhu et al. |
| 7,489,466 B2 | 2/2009 | Knigge et al. |
| 7,502,205 B1 | 3/2009 | Hurtado et al. |
| 7,508,617 B1 | 3/2009 | Mak et al. |
| 7,675,707 B1 | 3/2010 | Liu et al. |
| 7,724,470 B2 | 5/2010 | Poon et al. |
| 7,791,986 B2 | 9/2010 | Koyama et al. |
| 7,839,595 B1 | 11/2010 | Chue et al. |
| 7,876,655 B2 | 1/2011 | Sasaki |
| 7,898,759 B2 | 3/2011 | Matsumoto et al. |
| 7,916,420 B1 | 3/2011 | McFadyen et al. |
| 7,990,647 B2 | 8/2011 | Lille |
| 7,995,425 B2 | 8/2011 | Schreck et al. |
| 8,059,357 B1 | 11/2011 | Knigge et al. |
| 8,248,732 B2 | 8/2012 | Nishiyama et al. |
| 8,248,896 B1 | 8/2012 | Yuan et al. |
| 8,300,338 B1 | 10/2012 | McFadyen |
| 8,320,069 B1 | 11/2012 | Knigge et al. |
| 8,441,909 B1 | 5/2013 | Thayamballi et al. |
| 8,456,980 B1 | 6/2013 | Thayamballi |
| 8,477,569 B2 * | 7/2013 | Erden et al. ................ 369/13.01 |
| 8,619,508 B1 | 12/2013 | Krichevsky et al. |
| 8,743,667 B1 * | 6/2014 | Brockie et al. ............. 369/13.33 |
| 8,787,125 B1 * | 7/2014 | Lee ............................ 369/13.26 |
| 2002/0136115 A1 | 9/2002 | Kadlec et al. |
| 2006/0233061 A1 | 10/2006 | Rausch et al. |
| 2007/0014041 A1 | 1/2007 | Lille et al. |
| 2007/0230012 A1 | 10/2007 | Erden et al. |
| 2007/0291401 A1 | 12/2007 | Sun et al. |
| 2008/0158730 A1 | 7/2008 | Furukawa et al. |
| 2009/0207519 A1 | 8/2009 | Erden et al. |
| 2009/0225464 A1 | 9/2009 | Juang et al. |
| 2009/0251828 A1 | 10/2009 | Schreck et al. |
| 2009/0303629 A1 | 12/2009 | Nakano et al. |
| 2010/0123967 A1 | 5/2010 | Batra et al. |
| 2010/0232050 A1 | 9/2010 | Schreck et al. |
| 2011/0090602 A1 | 4/2011 | Nishiyama et al. |
| 2011/0205861 A1 | 8/2011 | Erden et al. |
| 2011/0292773 A1 | 12/2011 | Schreck et al. |
| 2012/0188859 A1 | 7/2012 | Hara et al. |
| 2013/0077453 A1 | 3/2013 | Alex |
| 2013/0091695 A1 * | 4/2013 | Shimazawa et al. ............ 29/601 |
| 2013/0170060 A1 * | 7/2013 | Johns et al. ...................... 360/59 |
| 2013/0294207 A1 * | 11/2013 | Erden et al. ................ 369/13.11 |
| 2014/0029397 A1 * | 1/2014 | Rausch et al. ............. 369/13.24 |

OTHER PUBLICATIONS

Patrick Gale, "Estimating Laser Diode Lifetimes and Activation Energy", ILX Lightwave Application Note 33, 2008, http://www.ilxlightwave.com/appnotes/AN%2033%20REV01%20Estimating%20Laser%20Diode%20Lifetimes%20&%20Activation%20Energy.pdf.

* cited by examiner

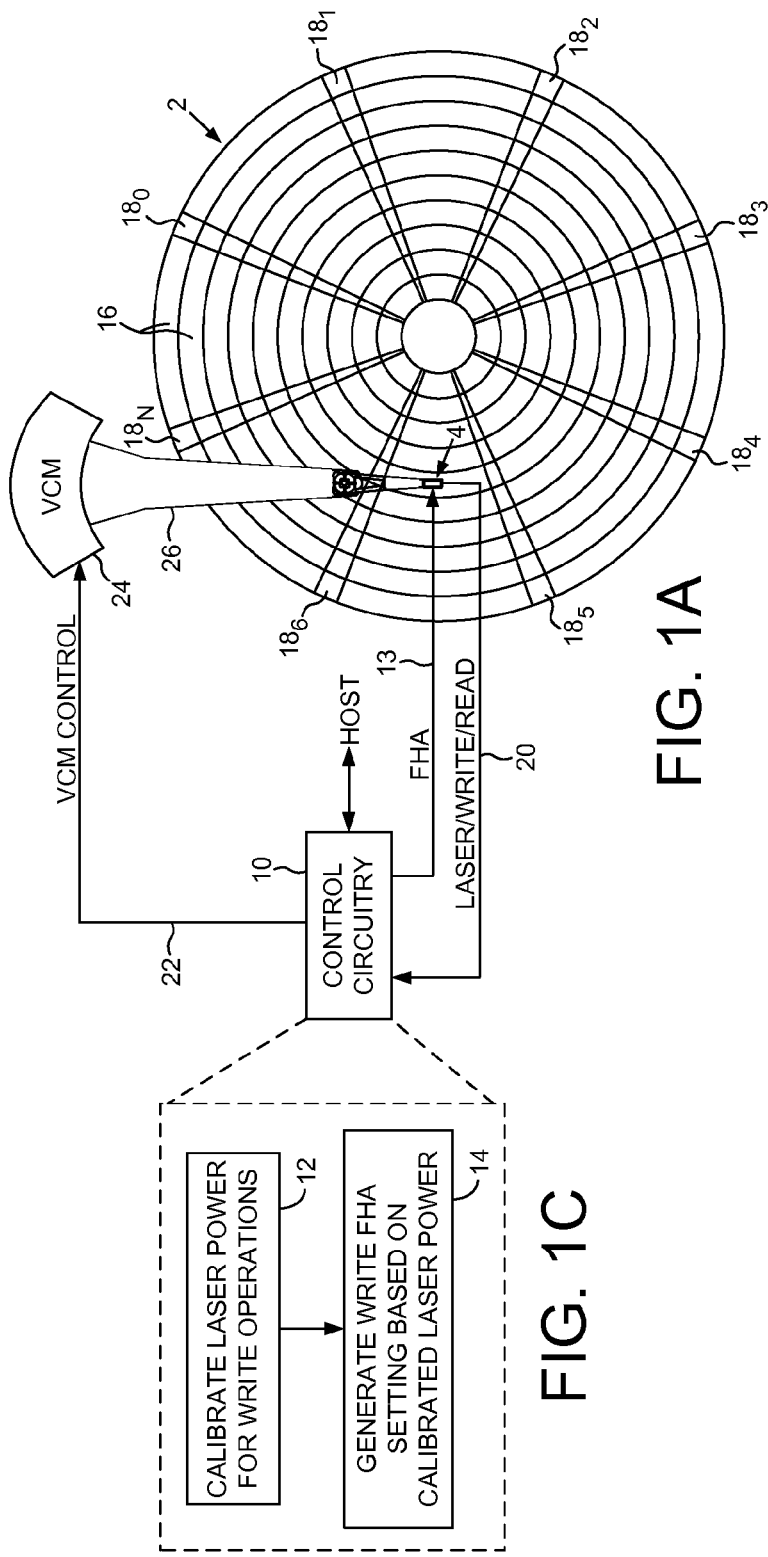
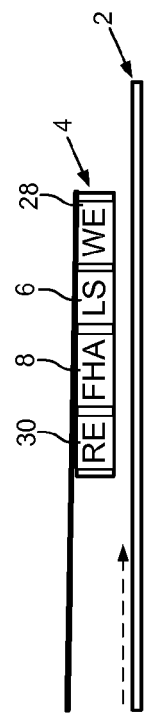
FIG. 1A
FIG. 1B
FIG. 1C

US 8,922,929 B1

DISK DRIVE CALIBRATING FLY HEIGHT ACTUATOR AND LASER POWER FOR HEAT ASSISTED MAGNETIC RECORDING

CROSS-REFERENCE TO RELATED APPLICATIONS

This application claims priority to provisional U.S. Patent Application Ser. No. 61/834,790, filed on Jun. 13, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

Since the quality of the write/read signal depends on the fly height of the head, conventional heads may comprise an actuator for controlling the fly height. Any suitable dynamic fly height (DFH) actuator may be employed, such as a heater which controls fly height through thermal expansion, or a piezoelectric (PZT) actuator. It is desirable to determine the appropriate DFH setting (e.g., appropriate current applied to a heater) that achieves the target fly height for the head.

BRIEF DESCRIPTION OF THE DRAWINGS

FIG. 1A shows a disk drive according to an embodiment comprising a head actuated over a disk.

FIG. 1B shows a head according to an embodiment comprising a read element, a write element, a fly height actuator (FHA), and a laser.

FIG. 1C is a flow diagram according to an embodiment wherein an FHA write setting is generated based on a calibrated laser power.

DETAILED DESCRIPTION

Figure 2:
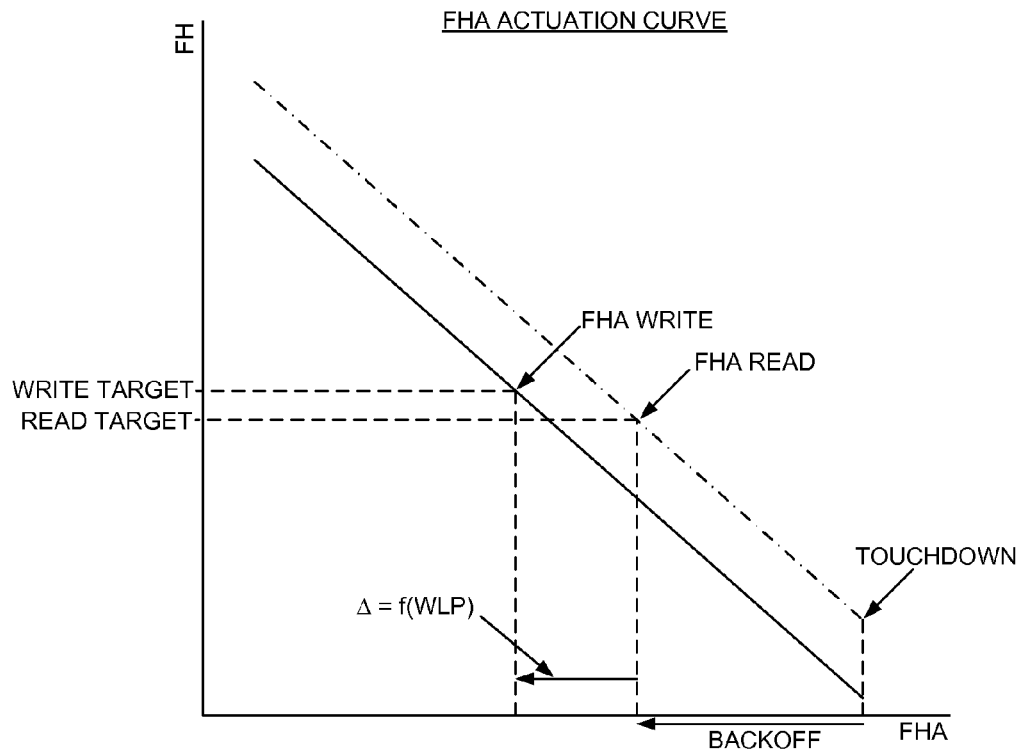
FIG. 2 illustrates an embodiment for generating the FHA write setting based on the calibrated laser power.

FIG. 1A shows a disk drive according to an embodiment comprising a disk 2, a head 4 (FIG. 1B) comprising a laser 6 operable to heat the disk 2 while writing data to the disk 2, and a fly height actuator (FHA) 8 operable to actuate the head 4 vertically over the disk 2. The disk drive further comprises control circuitry 10 operable to execute the flow diagram of FIG. 1C, wherein a laser power applied to the laser during a write operation is calibrated (block 12), and a FHA write setting 13 is generated for the FHA as a function of the calibrated laser power (block 14).

In the embodiment of FIG. 1A, the disk 2 comprises a plurality of servo tracks 16 defined by servo sectors $18_0$-$18_N$, wherein data tracks are defined relative to the servo tracks at the same or different radial density. The control circuitry 10 processes a read signal 20 emanating from the head 4 to demodulate the servo sectors $18_0$-$18_N$ and generate a position error signal (PES) representing an error between the actual position of the head and a target position relative to a target track. The control circuitry 10 filters the PES using a suitable compensation filter to generate a control signal 22 applied to a voice coil motor (VCM) 24 which rotates an actuator arm 26 about a pivot in order to actuate the head 4 radially over the disk 2 in a direction that reduces the PES. The servo sectors $18_0$-$18_N$ may comprise any suitable head position information, such as a track address for coarse positioning and servo bursts for fine positioning. The servo bursts may comprise any suitable pattern, such as an amplitude based servo pattern or a phase based servo pattern.

In the embodiment of FIG. 1B, the head 4 comprises a suitable write element 28, such as an inductive coil, and a suitable read element 30, such as a magnetoresistive element. The head 4 may comprise any suitable laser 6 for heating the disk 2, such as a laser diode, as well as any suitable optics for focusing the light emitted by the laser 6 onto the disk, such as a waveguide and a near field transducer (NFT). In addition, any suitable FHA 8 may be employed, such as a heater that actuates through thermal expansion, or a piezoelectric actuator that actuates through mechanical deflection.

In one embodiment, a laser power applied to the laser 6 during a write operation is calibrated to achieve optimal recording reliability. For example, if the laser power is too low it may result in under saturation of the magnetic media, and if the laser power is too high, it may cause erasure of data recorded in adjacent data tracks. In one embodiment, the calibration procedure involves writing a test pattern to the disk 2 and evaluating a suitable quality metric while reading the test pattern. This process is repeated at different laser powers until the quality metric exceeds a threshold.

Since the fly height of the head also affects the quality of the recorded data, and since the heating effect of the laser 6 on the head 4 decreases the fly height, in one embodiment an FHA write setting is generated based on the calibrated laser power. FIG. 2 illustrates an embodiment for generating the FHA write setting based on the calibrated laser power. In this embodiment, the laser power is set to zero (or near zero) so that the write components do not protrude toward the disk 2. The FHA setting 13 is increased from an initial value until a touchdown of the head 4 onto the disk 2 is detected. In one embodiment, a fly height measurement is also generated at each incremental FHA setting in order to generate an FHA actuation curve as shown in FIG. 2. Once touchdown has been detected, the FHA setting is decreased by a backoff value that corresponds to a target fly height during read operations (FHA read setting). In one embodiment, the fly height measurement in the FHA actuation curve that corresponds to the FHA read setting as shown in FIG. 2 becomes a target fly height of a closed-loop feedback system that controls the fly height of the head during read operations.

FIG. 2 also illustrates how the entire actuation curve will decrease by an offset (from the dashed line to the solid line) during write operations due to the heating effect of the laser 6. In order to compensate for this heating effect, the FHA setting is decreased (from the FHA read setting) by a delta based on the calibrated write laser power (WLP) to generate a corresponding FHA write setting as shown in FIG. 2. In one embodiment, the fly height measurement in the FHA actuation curve that corresponds to the FHA write setting becomes a target fly height of a closed-loop feedback system that controls the fly height of the head during write operations. In the example shown in FIG. 2, the fly height target for write operations is higher than the fly height target for read operations due to the fly height offset between the write element 28 and the read element 30. That is, during write operations the write element 28 may fly lower than the read element 30 due to the heating effect of the laser 6. If the fly height of the head is measured relative to the read element 30 (e.g., by reading a periodic pattern from the disk), the higher write fly height target compensates for the fly height offset between the write element 28 and the read element 30. In another embodiment, the fly height of the head may be controlled by applying the FHA write setting shown in FIG. 2 to the FHA 8 using an open-loop control system during write operations.

Figure 3:
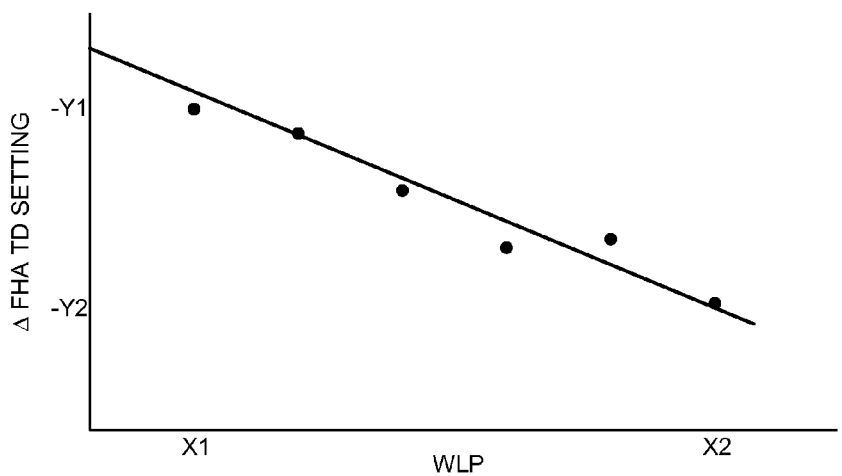
FIG. 3 shows an embodiment wherein a decrease in FHA touchdown settings relative to the write laser power are fitted to a curve (e.g., a line) that may be represented by a polynomial.

The delta for decreasing the FHA setting as shown in FIG. 2 may be generated based on the calibrated write laser power in any suitable manner. In one embodiment illustrated in FIG. 3, the touchdown calibration procedure described above may be performed over a range of laser power settings (X1 to X2) and a corresponding decrement in the FHA touchdown setting (−Y1 to −Y2) determined. That is, for each incremental increase in laser power there will be a corresponding decrease in the FHA setting that causes a touchdown event. In one embodiment, the decrease in the FHA touchdown settings relative to the write laser power as shown in FIG. 3 are fitted to a curve (e.g., a line) that may be represented by a polynomial. The delta in the FHA touchdown setting may then be computed as a function of the write laser power, and in one embodiment the delta in the FHA touchdown setting may be used to generate the delta for the FHA write setting shown in FIG. 2. In one embodiment, the range evaluated from X1 to X2 for the WLP settings in FIG. 3 spans the calibrated values that may be employed in each production disk drive (e.g., WLP settings near zero may be ignored since they are not used in a production disk drive and may also exhibit a non-linear relationship with the delta in the FHA touchdown setting).

Figure 4:
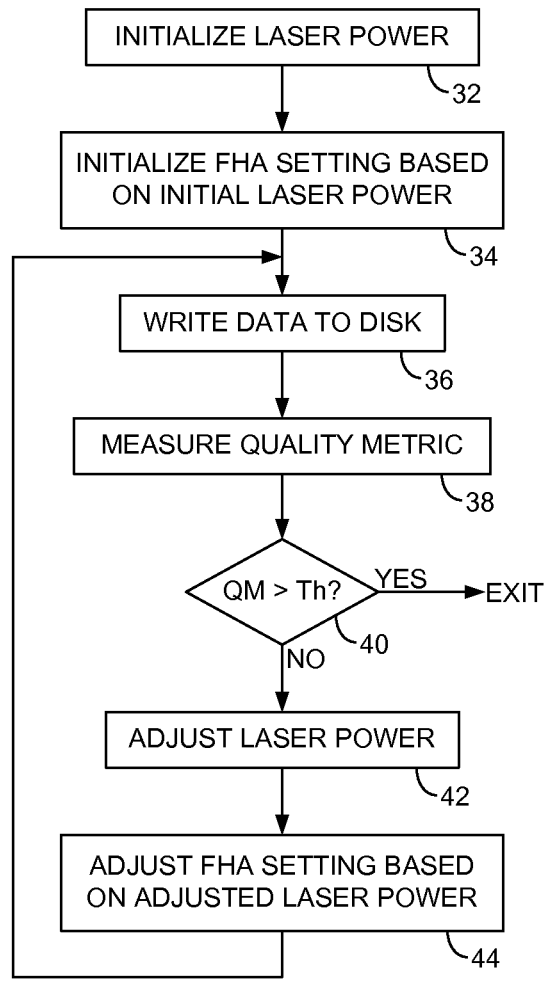
FIG. 4 is a flow diagram according to an embodiment wherein the FHA write setting is adjusted to maintain a substantially constant fly height when calibrating the laser power.

In one embodiment, the FHA write setting may be adjusted when calibrating the laser power. This embodiment is understood with reference to the flow diagram of FIG. 4 wherein the laser power is initialized, for example, to a low setting (block 32), and the FHA write setting is initialized based on the initial laser power (block 34). That is, the delta shown in FIG. 2 is generated based on the initial laser power and used to adjust the FHA write setting. Data is then written to the disk (block 36) and a quality metric of the write operation is generated (block 38) such as by measuring an off-track read capability. If the quality metric indicates a poor write quality (e.g., if the quality metric is less than a threshold at block 40), then the laser power is adjusted, for example, increased (block 42), and the FHA write setting is adjusted based on the adjusted laser power (block 44). The flow diagram is then repeated from block 36 until the quality metric indicates a good write quality (e.g., if the quality metric is greater than the threshold at block 40). In this manner, the laser power is calibrated by evaluating the write quality at different laser power settings while maintaining a substantially constant fly height by making an appropriate adjustment to the FHA write setting as the laser power is adjusted.

In one embodiment, the control circuitry 10 within each production disk drive may execute the touchdown procedure at different laser powers in order to generate the data points shown in FIG. 3, as well as curve fit the data to a polynomial that represents the relationship between the delta FHA touchdown setting and the write laser power. However, performing the touchdown procedure with a non-zero laser power may damage the optics used to focus the laser onto the disk surface, such as the near field transducer (NFT) which may protrude from the head at a very fine point. If the optics are damaged, it may render the head unusable. Accordingly, in one embodiment the data points shown in FIG. 3 may be generated by executing the touchdown procedure within a plurality of non-production disk drives in order to generate a nominal function representing the delta in the FHA touchdown setting relative to the write laser power.

Figure 5:
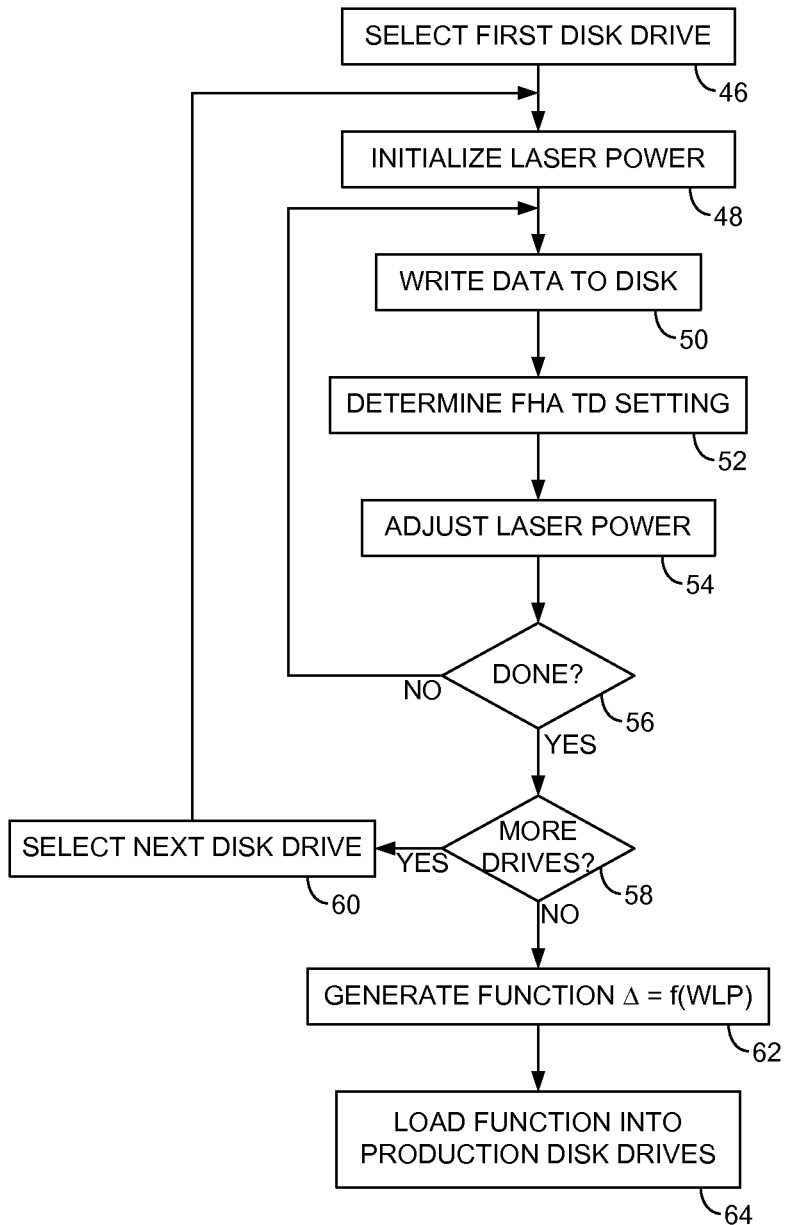
FIG. 5 is a flow diagram according to an embodiment wherein the data points shown in FIG. 3 may be generated by executing the touchdown procedure within a plurality of non-production disk drives in order to generate a nominal function representing the delta in the FHA touchdown setting relative to the write laser power.

This embodiment is understood with reference to the flow diagram of FIG. 5, wherein a first non-production disk drive is selected (block 46) and the laser power initialized, for example, to a low setting (block 48). Data is then written to the disk (block 50) and the FHA setting is adjusted until a touchdown is detected (block 52). If more laser power settings are to be evaluated (block 56), the laser power is adjusted, for example, by increasing the laser power (block 54). Data is again written to the disk (block 50) and the FHA setting is adjusted until a touchdown is detected (block 52). When a sufficient number of data points shown in FIG. 3 have been measured for the current non-production disk drive, the flow diagram of FIG. 5 is repeated after selecting another non-production disk drive (block 60). After measuring the data points of FIG. 3 for a number of non-production disk drives (e.g., at least three), a nominal function for computing the delta FHA touchdown setting relative to the write laser power is generated (block 62). The nominal function is then loaded into each production disk drive (block 64) where it is used to calibrate the laser power and corresponding FHA write setting by executing the flow diagram of FIG. 4.

The FHA actuation curve shown in FIG. 2 may be generated by measuring the fly height of the head at different FHA settings using any suitable technique. For example, a known technique for measuring the fly height is a harmonic ratio technique (Wallace spacing equation) that measures an absolute head-media spacing (HMS) according to the ratio of the amplitude of the read signal at two different harmonics while reading a periodic pattern from the disk 2 (e.g., a test pattern or a pattern recorded in a servo sector). In one embodiment, this harmonic ratio can be generated by reading a periodic pattern at two different frequencies (e.g., a 2T and 6T pattern).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
   a disk;
   a head comprising a laser operable to heat the disk while writing data to the disk;
   a fly height actuator (FHA) operable to actuate the head vertically over the disk; and
   control circuitry operable to:
      calibrate a laser power applied to the laser during a write operation; and
      generate an FHA write setting for the FHA by:
         performing a touchdown calibration at a substantially zero laser power to generate an initial setting for the FHA; and
         adjusting the initial setting by a delta based on the calibrated laser power.

2. The disk drive as recited in claim 1, wherein the delta is generated based on a function that represents a relationship between the laser power and a corresponding offset of the FHA write setting that causes a touchdown of the head on the disk for a nominal disk drive.

3. The disk drive as recited in claim 1, wherein the control circuitry is further operable to calibrate the laser power and generate the FHA write setting by:
   adjusting the laser power and making a corresponding adjustment to the setting for the FHA based on the adjusted laser power; and
   performing a write operation at the adjusted laser power and measuring a quality metric for the write operation.

4. A disk drive comprising:
   a disk;
   a head comprising a laser operable to heat the disk while writing data to the disk;
   a fly height actuator (FHA) operable to actuate the head vertically over the disk; and
   control circuitry operable to:
      while applying a first laser power to the laser, determine a first FHA write setting applied to the FHA that causes a touchdown of the head on the disk; and
      while applying a second laser power to the laser, determine a second FHA write setting applied to the FHA that causes the touchdown.

5. The disk drive as recited in claim 4, wherein the control circuitry is further operable to determine at least three FHA write settings that cause the touchdown for at least three different laser powers.

6. The disk drive as recited in claim 4, wherein the control circuitry is further operable to write data to the disk while applying the first laser power to the laser and while applying the second laser power to the laser.

7. A method of operating a disk drive comprising a disk, a head comprising a laser operable to heat the disk while writing data to the disk, and a fly height actuator (FHA) operable to actuate the head vertically over the disk, the method comprising:
   calibrating a laser power applied to the laser during a write operation; and
   generating an FHA write setting for the FHA km performing a touchdown calibration at a substantially zero laser power to generate an initial setting for the FHA; and
   adjusting the initial setting by a delta based on the calibrated laser power.

8. The method as recited in claim 7, wherein the delta is generated based on a function that represents a relationship between the laser power and a corresponding offset of the FHA write setting that causes a touchdown of the head on the disk for a nominal disk drive.

9. The method as recited in claim 7, further comprising calibrating the laser power and generating the FHA write setting by:
   adjusting the laser power and making a corresponding adjustment to the setting for the FHA based on the adjusted laser power; and
   performing a write operation at the adjusted laser power and measuring a quality metric for the write operation.

10. A method of operating a disk drive comprising a disk, a head comprising a laser operable to heat the disk while writing data to the disk, and a fly height actuator (FHA) operable to actuate the head vertically over the disk, the method comprising:
   while applying a first laser power to the laser, determining a first FHA write setting applied to the FHA that causes a touchdown of the head on the disk; and while applying a second laser power to the laser, determining a second FHA write setting applied to the FHA that causes the touchdown.

11. The method as recited in claim 10, further comprising determining at least three FHA write settings that cause the touchdown for at least three different laser powers.

12. The method as recited in claim 10, further comprising writing data to the disk while applying the first laser power to the laser and while applying the second laser power to the laser.

* * * * *